United States Patent
Shiraishi

(10) Patent No.: US 8,739,528 B2
(45) Date of Patent: Jun. 3, 2014

(54) HYBRID EXHAUST TURBINE TURBOCHARGER

(75) Inventor: Keiichi Shiraishi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 188 days.

(21) Appl. No.: 13/133,211

(22) PCT Filed: Apr. 24, 2009

(86) PCT No.: PCT/JP2009/058117
§ 371 (c)(1),
(2), (4) Date: Jun. 21, 2011

(87) PCT Pub. No.: WO2010/122653
PCT Pub. Date: Oct. 28, 2010

(65) Prior Publication Data
US 2011/0239648 A1    Oct. 6, 2011

(51) Int. Cl.
F02B 33/44    (2006.01)
F04B 17/00    (2006.01)

(52) U.S. Cl.
USPC ............................. 60/605.3; 417/407

(58) Field of Classification Search
USPC ............ 60/612, 605.1, 611, 607, 608, 605.3;
417/407; 184/6.11; 290/52; 310/54–55
See application file for complete search history.

(56) References Cited

U.S. PATENT DOCUMENTS

| | | | | |
|---|---|---|---|---|
| 4,209,207 A | * | 6/1980 | Schippers et al. | 417/407 |
| 4,460,284 A | * | 7/1984 | Lauterbach et al. | 384/905 |
| 4,752,193 A | * | 6/1988 | Horler | 417/407 |
| 5,045,711 A | * | 9/1991 | Swearingen | 290/52 |
| 5,076,755 A | * | 12/1991 | Okada | 384/99 |
| 5,735,676 A | * | 4/1998 | Loos | 417/407 |
| 5,870,894 A | * | 2/1999 | Woollenweber et al. | 417/407 |
| 6,575,865 B2 | * | 6/2003 | Takenaka et al. | 903/903 |
| 7,239,033 B2 | * | 7/2007 | Motoike et al. | 290/40 C |

(Continued)

FOREIGN PATENT DOCUMENTS

| | | |
|---|---|---|
| JP | 61-52413 | 3/1986 |
| JP | 3-120661 | 12/1991 |

(Continued)

OTHER PUBLICATIONS

Japanese Office Action issued Oct. 4, 2011 in corresponding Japanese Patent Application No. 2008-034915 w/English translation.

(Continued)

*Primary Examiner* — Thai Ba Trieu
*Assistant Examiner* — Shafiq Mian
(74) *Attorney, Agent, or Firm* — Wenderoth, Lind & Ponack, LLP

(57) ABSTRACT

A hybrid exhaust turbine turbocharger includes which a silencer-connected to an intake system of an internal combustion engine and supported by a casing via a compressor unit is provided upstream of the compressor unit, and in which a shell housing having a recess, accommodating a generator, therein is provided in a midsection of the silencer, an oil reservoir that holds a lubricant having lubricated a bearing disposed within the generator and dripped from the generator is formed at a bottom section of the shell housing, and the lubricant accumulated in the oil reservoir is returned by gravity to an oil tank disposed downstream via a lubricant discharge tube that communicates with the oil reservoir.

3 Claims, 3 Drawing Sheets

(56) References Cited

U.S. PATENT DOCUMENTS

| | | | |
|---|---|---|---|
| 7,430,865 B2 * | 10/2008 | Filippone | 60/618 |
| 7,692,326 B2 * | 4/2010 | Ono et al. | 290/52 |
| 7,810,384 B2 * | 10/2010 | Ono et al. | 73/112.01 |
| 2008/0203732 A1 * | 8/2008 | Ono et al. | 290/52 |
| 2010/0175377 A1 * | 7/2010 | Hippen et al. | 60/602 |

FOREIGN PATENT DOCUMENTS

| | | | | |
|---|---|---|---|---|
| JP | 4-2950 | | 1/1992 | |
| JP | 7-123627 | | 5/1995 | |
| JP | 2004150367 A | * | 5/2004 | |
| JP | 2005-184982 | | 7/2005 | |
| JP | 2005184982 A | * | 7/2005 | F04B 39/00 |
| JP | 2007-56790 | | 3/2007 | |

OTHER PUBLICATIONS

International Search Report issued Aug. 4, 2009 in International (PCT) Application No. PCT/JP2009/058117.
Japanese Office Action issued May 15, 2012 in corresponding Japan Patent Application No. 2008-034915 with English translation.
Decision to Grant issued Jul. 5, 2013 in corresponding Chinese patent appilcation No. 200980152784.7.
Notice of Allowance issued Sep. 24, 2013 in corresponding Korean patent application No. 10-2011-7014081.

* cited by examiner

HYBRID EXHAUST TURBINE TURBOCHARGER

BACKGROUND OF THE INVENTION

I. Technical Field

The present invention relates to hybrid exhaust turbine turbochargers, particularly, to a hybrid exhaust turbine turbocharger fitted in a marine internal-combustion engine, an internal combustion engine for a land-based generator, or the like.

II. Description of the Related Art

A known type of such a hybrid exhaust turbine turbocharger includes a generator whose rotation shaft is coupled to a rotation shaft of a turbine and a compressor of the turbocharger (for example, see Japanese Unexamined Patent Application, Publication No. 2007-056790).

SUMMARY OF THE INVENTION

With regard to a hybrid exhaust turbine turbocharger having such a configuration, it is necessary to supply a large amount of lubricant to bearings (e.g., sliding bearings) that rotatably support the rotor shaft of the generator, which is compact and rotates at high speed (about 10,000 rpm). However, providing a space within the generator into which the lubricant having lubricated the bearing drips by gravity is difficult without increasing the dimensions thereof. Therefore, a lubricant circulation pump that can supply a large amount of lubricant to the bearing and a lubricant suction pump that sucks the lubricant and returns the lubricant to an oil tank after lubrication are required, which is a problem in terms of high manufacturing costs and high maintenance costs.

In view of the circumstances described above, an object of the present invention is to provide a hybrid exhaust turbine turbocharger that allows for a reduction in manufacturing costs and maintenance costs.

Solution to Problem

In order to solve the aforementioned problem, the present invention employs the following solutions.

A hybrid exhaust turbine turbocharger according to the present invention includes a turbine unit that is driven by exhaust gas guided from an internal combustion engine, a compressor unit that is driven by the turbine unit so as to pump outside air to the internal combustion engine, and a casing that supports the turbine unit and the compressor unit. A silencer connected to an air intake system of the internal combustion engine and supported by the casing via the compressor unit is provided upstream of the compressor unit, and a shell housing having a recess, accommodating a generator, therein is provided in a midsection of the silencer. In the hybrid exhaust turbine turbocharger, an oil reservoir that holds a lubricant having lubricated a bearing disposed within the generator and dripped from the generator is formed at a bottom section of the shell housing, and the lubricant accumulated in the oil reservoir is returned by gravity to an oil tank disposed downstream via a lubricant discharge tube that communicates with the oil reservoir.

With the hybrid exhaust turbine turbocharger according to the present invention, the lubricant having lubricated the bearing in the generator and dripped into the oil reservoir travels through the lubricant discharge tube so as to be returned (naturally) to the oil tank by gravity alone, thereby eliminating the need for a lubricant suction pump, which is required in the related art. This allows for a reduction in manufacturing costs and maintenance costs.

Because an internal combustion engine according to the present invention includes a hybrid exhaust turbine turbocharger that allows for a reduction in manufacturing costs and maintenance costs, the manufacturing costs and the maintenance costs of the entire internal combustion engine can be reduced.

The present invention advantageously allows for a reduction in manufacturing costs and maintenance costs.

DETAILED DESCRIPTION OF THE INVENTION

An embodiment of a hybrid exhaust turbine turbocharger according to the present invention will be described below with reference to FIGS. 1 to 3.

Figure 1:
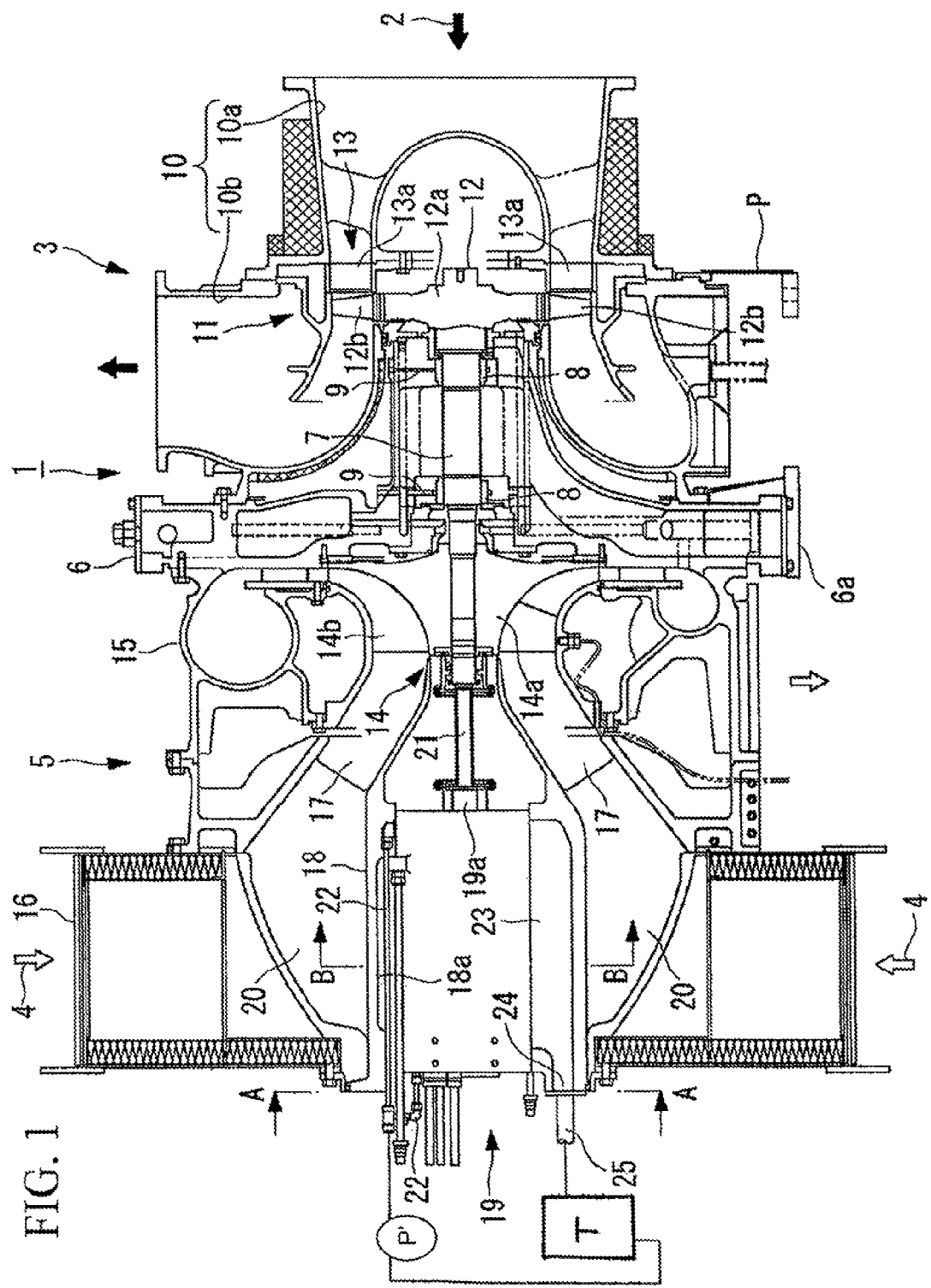
FIG. 1 is a longitudinal sectional view of a hybrid exhaust turbine turbocharger according to an embodiment of the present invention.
Figure 2:
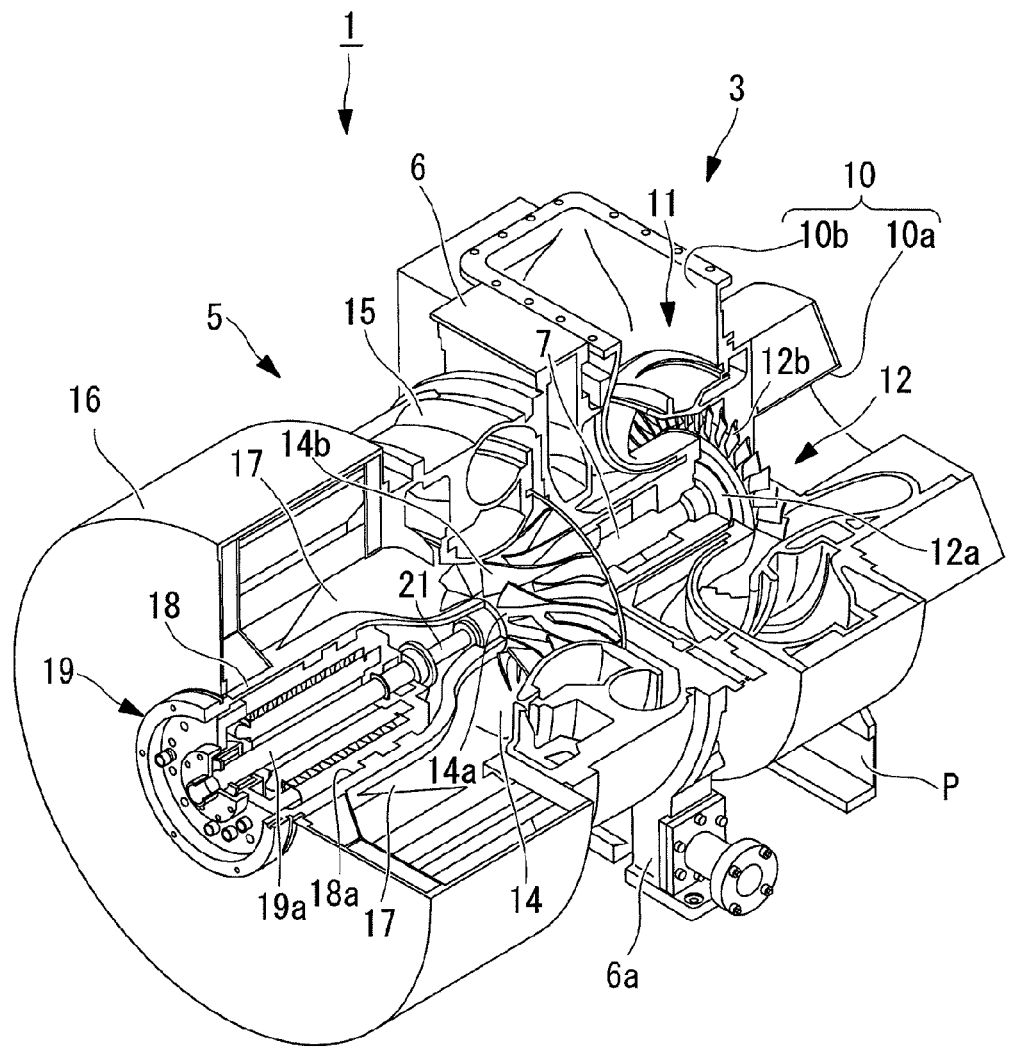
FIG. 2 is a partially-cutaway perspective view of the hybrid exhaust turbine turbocharger shown in FIG. 1, as viewed from a silencer side.
Figure 3A:
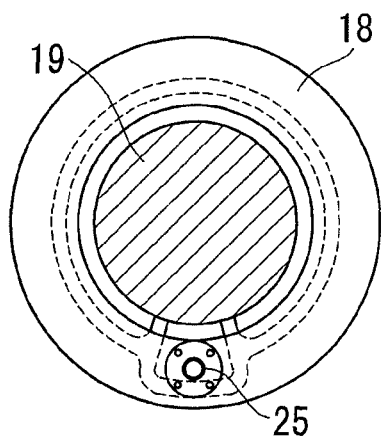
FIG. 3A is a cross-sectional view taken along line A-A in FIG. 1.

As shown in FIGS. 1 and 2, a hybrid exhaust turbine turbocharger 1 according to this embodiment mainly includes a turbine unit 3 that is driven by exhaust gas (combustion gas) 2 guided from an internal combustion engine (such as a diesel engine or a gas turbine engine) (not shown), a compressor unit 5 that is driven by the turbine unit 3 so as to pump outside air 4 to the internal combustion engine, a casing 6 provided between the turbine unit 3 and the compressor unit 5 and supporting these units, and a generator 19 having a rotation shaft 19a that is coupled to a rotation shaft 7 of the turbine unit 3 and the compressor unit 5 via a flexible coupling 21.

The rotation shaft 7, one end of which protrudes toward the turbine unit 3 and the other end of which protrudes toward the compressor unit 5, extends through the casing 6. The rotation shaft 7 is rotatably supported about an axis by bearings 8 provided in the casing 6. The casing 6 is provided with lubricant supply passages 9 that supply a lubricant from an oil tank (lubricant reservoir) T to the bearings 8.

A lower end of the casing 6 serves as a leg portion 6a that supports the casing 6 at one point in the axial direction of the rotation shaft 7 (or sometimes at two or more points in a direction orthogonal to the axial direction of the rotation shaft 7), and this leg portion 6a is fixed to a base (not shown) set on the floor. Specifically, the weight of the hybrid exhaust turbine turbocharger 1 is transmitted to the base via the leg portion 6a.

Reference character P in the drawings denotes a punching plate. One end of the punching plate P is fixed to a lower end of the turbine unit 3, and the other end thereof is fixed to the base, like the leg portion 6a of the casing 6. The main purpose of this punching plate P is not to support the weight of the hybrid exhaust turbine turbocharger 1, like the leg portion 6a, but to prevent the occurrence of thermal stress by absorbing thermal expansion of the casing 6 in the axial direction while preventing the hybrid exhaust turbine turbocharger 1 from shaking (vibrating) relative to the base.

The turbine unit 3 has an exhaust gas passage 10 that is connected to an exhaust system of the internal combustion engine so as to receive at least a portion of the exhaust gas 2, and a turbine 11 that is rotationally driven by receiving the flow of the exhaust gas 2 supplied into the exhaust gas passage 10.

The turbine 11 includes a turbine rotor 12 and a turbine nozzle 13. The turbine rotor 12 includes a disk-shaped turbine disk 12a provided at one end of the rotation shaft 7 and a plurality of turbine blades 12b attached to the periphery of the turbine disk 12a and each having an airfoil shape in cross section.

The turbine nozzle 13 is constituted of a plurality of annularly-arranged nozzle guide vanes 13a and is disposed upstream of the turbine blades 12b.

The exhaust gas passage 10 has a supply passage 10a that is connected to the exhaust system of the internal combustion engine and guides the exhaust gas 2 to the nozzle guide vanes 13a and the turbine blades 12b, and also has a delivery passage 10b that is provided radially outward of the turbine 11 and guides the exhaust gas 2 passing through the turbine 11 to the outside of the system or to an exhaust gas purifier, an exhaust gas boiler, or the like (not shown).

The compressor unit 5 has a compressor impeller 14 that delivers the outside air 4 radially outward when rotationally driven, and a centrifugal chamber 15 that surrounds the compressor impeller 14 and compresses the outside air 4 delivered by the compressor impeller 14.

The compressor impeller 14 includes a substantially disk-shaped hub 14a attached to the other end of the rotation shaft 7 and a plurality of blades 14b extending radially outward from the outer surface of the hub 14a and annularly provided in the circumferential direction.

A silencer 16 connected to an air intake system of the internal combustion engine is disposed adjacent to the upstream side of the compressor unit 5, and the outside air 4 passing through this silencer 16 is guided to the blades 14b of the compressor impeller 14 via an inflow passage 17. An intercooler, a surge tank, or the like (not shown) is provided downstream of the compressor unit 5, and the outside air 4 passing through the centrifugal chamber 15 passes through the intercooler, the surge tank, or the like before being supplied to the internal combustion engine.

A shell housing 18 having a recess 18a that tapers toward an end surface of the hub 14a is provided in a midsection of the silencer 16, and the (high-speed induction) generator 19 is accommodated within the recess 18a. The shell housing 18 is fixed to the compressor unit 5 (i.e., a radially outer wall that forms the inflow passage 17) via a plurality of (e.g., four) supports 20 provided within the inflow passage 17. An outer surface of the shell housing 18 constitutes a radially inner wall that forms the inflow passage 17.

The rotation shaft 19a of the generator 19 is disposed so as to be positioned on the same rotation axis as that of the rotation shaft 7 described above. Moreover, the rotation shaft 19a is coupled, via the coupling 21, to the tip of one end of the rotation shaft 7 extending through the hub 14a and protruding toward the silencer 16. Specifically, the rotation shaft 19a of the generator 19 rotates together with the rotation shaft 7.

Referring to FIG. 1, a top rear section (i.e., an upper right section in FIG. 1) and an upper section of a front surface (i.e., a left end surface in FIG. 1) of the shell housing 18 in the hybrid exhaust turbine turbocharger 1 according to this embodiment are each provided with a lubricant inlet (not shown) that guides a lubricant to a bearing (e.g., slide bearing) (not shown) of the generator 19 accommodated in the recess 18. One end of a lubricant supply tube 22 equipped with a lubricant circulation pump P' is connected to an intermediate section of each lubricant inlet.

A bottom section (i.e., a lower section) of the front surface of the shell housing 18 is provided with a lubricant outlet 24 that guides the lubricant (not shown) accumulated in an oil reservoir 23, to be described later, to the outside. The lubricant outlet 24 is connected to a lubricant discharge tube 25 that guides the discharged lubricant to the aforementioned oil tank T.

A bottom section (i.e., a lower section) of the oil tank is connected to the other end of the lubricant supply tube 22. The lubricant accumulated in the oil tank is pumped into the lubricant supply tube 22 by the lubricant circulation pump P' so as to lubricate the bearing in the generator 19, and is subsequently returned to the oil tank T via the oil reservoir 23 and the lubricant discharge tube 25.

Figure 3B:
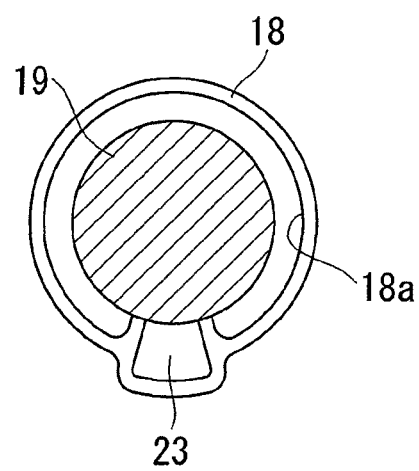
FIG. 3B is a cross-sectional view taken along line B-B in FIG. 1.

The oil reservoir 23 extends in the longitudinal direction (i.e., the left-right direction in FIG. 1) of the shell housing 18, is a space substantially having the shape of an isosceles trapezoid in cross section, as shown in FIG. 3B, and is provided at the bottom section (lower section) of the shell housing 18.

With the hybrid exhaust turbine turbocharger 1 according to this embodiment, the lubricant having lubricated the bearing in the generator 19 and dripped into the oil reservoir 23 travels through the lubricant outlet 24 so as to be returned (naturally) to the oil tank by gravity alone, thereby eliminating the need for a lubricant suction pump, which is required in the related art. This allows for a reduction in manufacturing costs and maintenance costs.

The present invention is not limited to the above-described embodiment and permits modifications and alterations where appropriate so long as they do not depart from the technical scope of the invention.

For example, although the other end of the lubricant supply tube 22 is directly connected to the oil tank in the above-described embodiment, this other end of the lubricant supply tube 22 may alternatively be connected to a lubricant supply tube that communicates with the oil tank and the lubricant supply passages 9.

This eliminates the need for the lubricant circulation pump connected to the intermediate section of the lubricant supply tube 22, thereby allowing for a further reduction in manufacturing costs and maintenance costs.

The invention claimed is:

1. A hybrid exhaust turbine turbocharger comprising:
 a turbine unit configured to be driven by exhaust gas guided from an internal combustion engine;
 a compressor unit configured to be driven by the turbine unit so as to pump outside air to the internal combustion engine;
 a casing configured to support the turbine unit and the compressor unit;
 a silencer connected to an intake system of the internal combustion engine and supported by the casing via the compressor unit and being disposed upstream of the compressor unit;
 a shell housing having a bottom section and a recess therein, the shell housing being disposed in a midsection of the silencer, and the recess accommodating a generator;
 an oil reservoir configured to hold a lubricant after the lubricant has lubricated a bearing disposed within the generator and dripped from the generator, the oil reservoir being disposed at a bottom section of the shell housing; and
 a lubricant discharge tube communicating with the oil reservoir, and being configured to return the lubricant accumulated in the oil reservoir by gravity to an oil tank disposed downstream, wherein one end of the lubricant discharge tube is connected to lubricant outlet that is provided at a bottom section of a front surface of the oil reservoir.

2. An internal combustion engine comprising a hybrid exhaust turbine turbocharger according to claim 1.

3. The hybrid exhaust turbine turbocharger according to claim 1, wherein the oil reservoir extends in a longitudinal direction of the shell housing and is a space substantially having a shape of an isosceles trapezoid in cross section.

\* \* \* \* \*